Inventors: Alfred J. Hermont
Jerome C. Toups
By _____
Their Attorney

April 3, 1951

A. J. HERMONT ET AL 2,547,703

SEISMIC EXPLORATION SYSTEM

Filed July 10, 1948

Inventors: Alfred J. Hermont
Jerome C. Toups
By
Their Attorney

Patented Apr. 3, 1951

2,547,703

UNITED STATES PATENT OFFICE 2,547,703

SEISMIC EXPLORATION SYSTEM

Alfred J. Hermont, Houston, and Jerome C. Toups, Bellaire, Tex., assignors to Shell Development Company, San Francisco, Calif., a corporation of Delaware Application July 10, 1948, Serial No. 38,014

3 Claims. (Cl. 346—33)

This invention pertains to seismic exploration and relates more particularly to a method and a system for automatically controlling the volume, gain or energy level at which a recording seismograph operates.

In seismic recording, the relative intensities of the signals produced by seismic detectors, or rather the relative energy levels of signal input may vary, throughout a single operational period, by factors such as 10, 100, 1000, 10,000 or more, or, to use another method of notation, by 20, 40, 60, 80 or more decibels. It is the function of the transmission and amplification network interposed between the detectors and the recorder to apply to these signals or signal levels a suitable amplification or attenuation control in such a manner that a legible, significant and substantially undistorted seismogram may be produced by the recorder.

It is therefore an object of this invention to provide an improved seismic recording system with an automatic volume or gain control circuit capable of handling input energy level variations of the order of 70 or more decibels with a substantially flat output energy level characteristic. It is also an object of this invention to provide a forward-acting control system of the above type. It is also an object of this invention to provide a system of the above type wherein the desired control is achieved by means of a plurality of control sections or stages arranged in cascade, said sections comprising non-linear resistor or semiconductor elements determining the range and operation thereof.

It is also an object of this invention to provide a control system having a substantially constant reaction time, this term being used to define the time required to restore the output level to approximately 75% of its normal value after said normal value had been exceeded by an input signal of any given intensity. It is also an object of this invention to provide an automatic seismograph volume control system capable of effective operation without presuppression and substantially free of phase shift.

These and other objects of this invention will be understood from the following description, taken with reference to the attached drawings, wherein.

Figure 1:
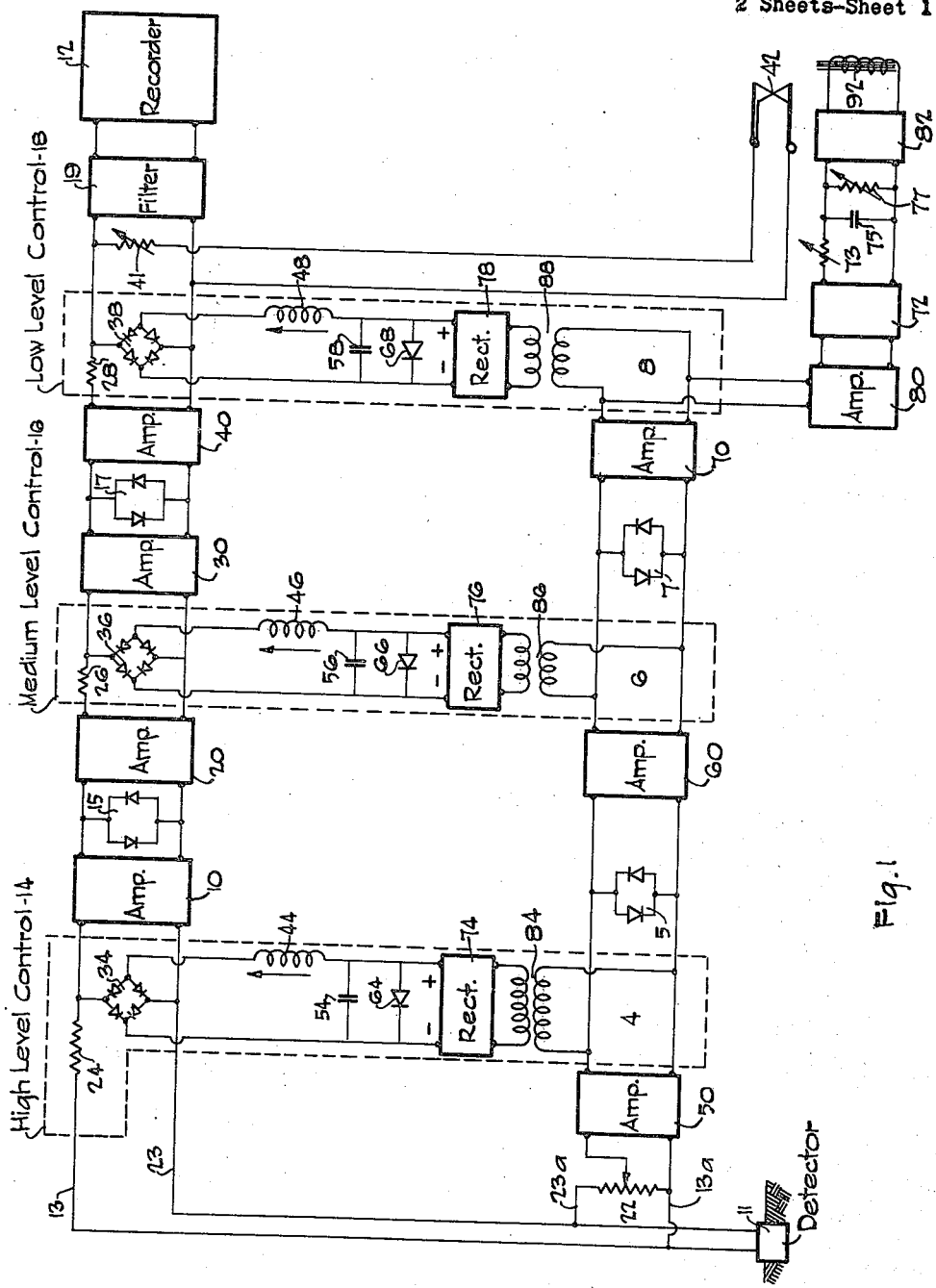
Fig. 1 is a simplified circuit diagram of the present system.

Referring to Fig. 1, a detector 11, suitably buried or disposed in the ground, translates seismic waves into electrical impulses or signals which are transmitted, through the transmission or amplifier-controlled circuits of the present invention, to a galvanometer string or recording element of the recorder 12. It is understood that seismic exploration systems used in the field normally employ a plurality of seismic detectors. The present invention is equally operative with any desired number of detectors, but will be described for simplicity with regard to a system comprising a single detector, as shown in Fig. 1.

The transmission and amplification circuit having conductors 13 and 23 connected between the detector 11 and the recorder 12, comprises a plurality of control sections connected in cascade. Although any number of such sections may be used according to this invention, it is preferred that such number be not less than three: for example, a high-level control section 14, a medium level section 16 and a low level section 18.

The high-level control section 14 comprises essentially a resistance 24 and a balanced bridge 34 connected across the conductors 13 and 23 and having a variable non-linear resistance element in each of the four arms thereof.

Non-linear resistances are resistances whose ability to pass electric current is a function of the intensity and polarity of the current flowing therethrough, such for example as selenium or copper oxide semiconductor elements. For low intensities of current passed in a predetermined (forward) direction, and for low intensities of current passed in the opposite (backward) direction, non-linear resistance elements have extremely high values of resistance, while for higher intensities of current passed in the forward direction, they have relatively low values of resistance. For example, a copper oxide rectifier may have a resistance of over 30,000 ohms for a forward current of 0.0001 milliampere, and a resistance of only about 50 ohms for a forward current of 1 milliampere.

The resistance 24 and the bridge 34 act in conjunction as a variable potentiometer.

The meduim and low level control sections 16 and 18 comprise similar resistances 26 and 28 and bridges 36 and 38 respectively.

The high and the medium level control sections 14 and 16 are connected to each other through one stage amplifiers 10 and 20. Connected across leads 13 and 23 between amplifiers 10 and 20 is a signal limiter 15 having two parallel branches each comprising a non-linear resistance element connected to pass current in a direction opposite to that of the other branch.

The medium and low level control sections 16 and 18 are similarly connected to each other by means comprising amplifiers 30 and 40 and a signal limiter 17.

The low level control section 18 is connected to the recorder 12 by means of a high-pass filter 19.

Connected to the conductors 13 and 23 through a potentiometer 22 is a controller circuit comprising high, medium, and low level controller sections or stages 4, 6 and 8 corresponding to and associated with the control sections 14, 16 and 18 to form control units.

The high level controller section comprises an isolation transformer 84, a rectifier 74, which may be of the vacuum tube, copper oxide or any other desired type, a current limiter 64 comprising a single element of a type similar to those used in the current limiters 15 or 17, said current limiter 64 being connected across the output of rectifier 74 in such a manner as to present a relatively low resistance load to the rectifier and thereby to cause the control current to reach a suitable limit at a suitable volume level, and a filter comprising a condenser 54 and a choke 44.

The high-level controller section connects the rectifier 74 to the bridge 34 in such a manner that the output current of the rectifier passes as a control current in a forward direction through the two parallel non-linear resistance branches thereof, said branches being connected at their mid-points to conductors 13 and 23, as stated above.

The medium and low-level controller sections 6 and 8 are arranged in a manner identical to that described with regard to the high level controller section 4.

Connected into the controller circuit ahead of the sections 4, 6 and 8 thereof are amplifiers 50, 60 and 70 respectively, amplifiers 60 and 70 connecting the high, medium and low controller sections to each other. Connected across the controller circuit between sections 4 and 6 is a signal limiter 5, similar to the signal limiter 15. Another signal limiter 7 is similarly connected between sections 6 and 8.

Connected across the low level bridge 38 is an initial suppressor circuit comprising an adjustable resistance 41, normally open relay contacts 42 and a relay circuit to be described in greater detail hereinbelow.

The operation of the present system is as follows:

Upon the detonation of an explosive charge at the shot point, the detector 11 will produce, under the influence of the seismic waves from the shot point, a series of electric impulses or signals. As stated above, the relative intensity of the energy levels of these signals varies by a factor as high as 10,000 or more, that is, by 80 decibels or more. In order that a legible and significant seismogram may be produced by the recorder, the present system must therefore apply an automatic volume or gain control in a range from zero to about eighty decibels, a level of zero decibels being assigned to a permissible deflection of the recording galvanometer element.

For this purpose, the signals from the detector 11 are transmitted to the recorder 12 through the main transmission channel comprising the desired amplification stages 10, 20, 30 and 40. At the same time, these signals are also fed to the controller channel comprising amplifiers 50, 60 and 70. As seen from Fig. 1, the two channels are linked together by means forming the high, medium, and low level control units. The signals passing into the controller channel are transmitted by transformers 84, 86 and 88 to rectifiers 74, 76 and 78. The direct current output of these rectifiers is then passed as a control current through the bridges 34, 36 and 38, comprising, as stated above, non-linear elements whose normally extremely high resistance drops under the effect of said rectified current flow to a relatively low value. The bridges 34, 36 and 38 thus form relatively low resistance shunts for voltages across the main transmission channel and thus serve to attenuate excessively strong signals.

Since the attenuating or resistance reducing effect of the attenuator bridges is determined by the instantaneous values of the non-linear resistance elements thereof, which in turn depend on the instantaneous values of the control direct current passed therethrough by the rectifiers, and since the intensity of said control current depends on the magnitude of the signals supplied to the controller channel by the detector, it will be seen that an essentially automatic volume or gain control is provided by the system of Fig. 1 for the signals transmitted to the recorder 12.

It should be particularly noted that an essential feature of the present invention resides in effecting the desired signal attenuation and control by means of a plurality of level control sections or stages, rather than by means of a single stage.

As stated above, the input signal level variations are often of the order of 80 decibels, with an initial level sometimes reaching as high as 100 decibels. However, the range over which control must be exercised during normal recording does not exceed 70 decibels, the balance consisting not of useful energy, but of effects such as are due to direct and refracted waves, etc.

It can be shown both experimentally and analytically that with the types of copper oxide or selenium non-linear resistance elements such as are used in field work for practical reasons, an almost ideal forward-acting steady state control characteristic can be obtained for only a range of about 20 to 25 decibels. That is, if the level of the input signals from the detector 11 increases by 20 decibels, the direct current from rectifier 78 may be made to increase as a function of said level, in such a manner as to reduce the resistance of the bridge 38 by an amount almost exactly sufficient to result in an additional loss of 20 decibels, thereby maintaining said output level substantially constant. Since it is desired to exercise control over a total range of about 70 decibels, it will be seen that the desired result may be readily achieved by using three control sections in cascade.

Another advantage in providing multiple level control sections resides in the fact that, due to technical limitations, the non-linear elements included in bridges 34, 36 or 38 are not sufficiently identical to permit each of said bridges to be balanced with the desired accuracy. The rectification ripple which is present in the direct current supplied to the control bridge, in spite of filter elements such as 44 and 54, as well as the transient character of said control current, tends to produce an unbalance voltage across the control bridge at the points where the latter is connected to the line. Since this unbalance voltage would necessarily be amplified by the following amplification stages, the output current of the main transmission channel would contain both harmonics and transients and would thus defeat the desired requirement of fidelity of transmission were it attempted to effect the whole desired attenuation by means of a single control unit.

Figure 3:
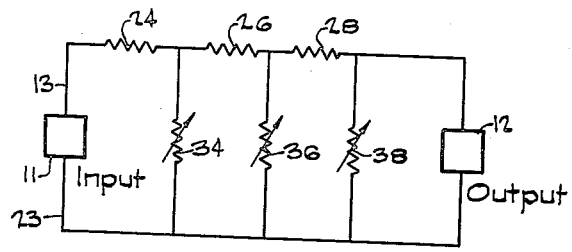
Figs. 2 and 3 are simplified diagrams of equivalent single and multi-section transmission and control circuits or units.

The main reason for using a multiple stage control in the present system is however as follows:

Fig. 3 shows an equivalent oversimplification of the transmission channel of Fig. 1. The three variable resistances X (34, 36 and 38) may be assumed to vary simultaneously in accordance with the exponential law:

$$X = X_0 - X_m \left(1 - e^{-\frac{1}{T}t}\right)$$

wherein $t$ is time; $T$ is the time constant, that is, the time required for X to change by an amount $.632 X_m$; X represents instantaneous values of resistances 34, 36 and 38; and $X_0$ and $X_m$ are values of X chosen so that $X=X_0$ for $t=0$, and $X=X_0-X_m$ for $t=\infty$.

Figure 2:
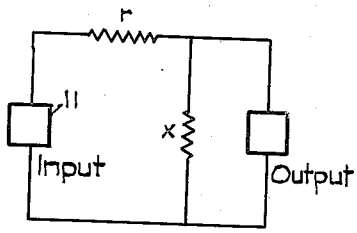
Figure 4:
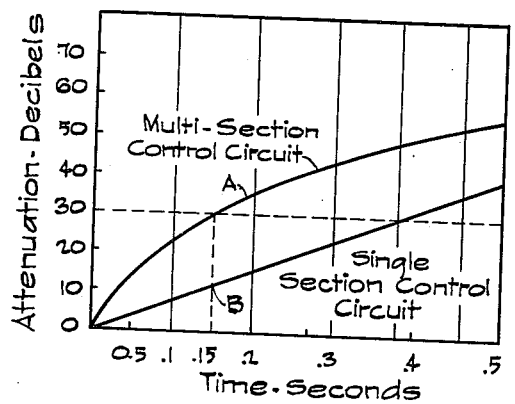
Fig. 4 is a graph showing comparative time-attenuation curves for single and multi-section control systems.

For certain numerical values, the attenuation achieved is shown as curve A in Fig. 4. If now the circuit of Fig. 3 is changed to another equivalent circuit such as shown in Fig. 2, and the values of X are chosen so as to produce the same final attenuation while keeping the same time constant, then the attenuation achieved by the circuit of Fig. 2 is shown as curve B in Fig. 4. From curves A and B of Fig. 4 it will be seen that a considerably faster control may be achieved by means of a multiple control unit circuit, which is capable to produce, for example, an attenuation of 30 decibels in .15 second, than by means of a single control section circuit, which requires .375 second for the same purpose. This is of considerable importance because although the selection of the time constant is determined by other considerations, an increase of the initial rate of attenuation may be achieved according to this invention by using a plurality of control sections in cascade or series.

The same situation prevails in case of a sudden decrease or even total collapse of the input signal level: all three control sections act simultaneously to remove the attenuation previously applied, thereby giving a considerably shortened reaction time.

It should be noted in this connection that the "initial reaction time," that is, the period of time immediately following the reception of initial energy, during which no attempt is made to control the deflections of the galvanometer elements, usually extends for approximately .15 second. During the remainder of the control period, the reaction time should be as nearly constant as possible for all levels of signal input and should be governed by requirements arising only from seismological considerations, and not from requirements dictated by the necessity of bringing the system under control, of minimizing the rectification ripple, etc. This reaction time, referring for example to a step-wise change of about 20 decibels, should be approximately from .2 to .3 second. That is, irrespective of whether the level of signal input to the main transmission channel of Fig. 1 abruptly increases or decreases by 20 decibels, the time for the output level of said channel to reach its final controlled value to within ±2.5 decibels of its normal value, should be from .2 to .3 second.

With this in mind, and with reference to Figs. 1 and 5 of the drawings, the operation of the present system may be briefly summarized as follows:

As soon as the level of the signal input from the detector 11 begins to increase from the predetermined zero decibels level, the low level section 18 begins to exercise control, the medium and high level sections 16 and 14 remaining as yet inoperative. This is due to the fact that the signal input travelling through the control channel is subjected to repeated amplification at amplifiers 50, 60 and 70 before reaching transformer 88 of the low level section. As soon as the low level section 18 begins to operate, the direct current output of the rectifier 78, which is a direct function of the level of said signal input, is passed as a control current through the bridge 38, thus reducing the resistance of said bridge and thereby introducing an additional loss or attenuation in the main transmission channel. In other words, it may be said that a sufficient electric loss is imposed on or injected into the main transmission channel at bridge 38 to offset the effect of the rise of the signal level from detector 11. With a proper design of the control units, a substantially linear control may be obtained, that is, any increase in the level of the input signal, as expressed in decibels, will result in an injected loss or attenuation in the main transmission channel of a substantially equal decibel value, so that the output level remains at the predetermined or zero value.

Since, as explained above, it is essential that each of the control sections exercise control only within its predetermined range of input signal level, the low level control section 18 is designed, for example, to maintain control within a suitable low input level range, such as from zero to 25 decibels.

This means in effect that for a level of signal input below that determined upon as zero, the rectification of the signals by rectifier 78 will not produce a control direct current capable of appreciably affecting the resistance of the bridge 38, but for a signal input level between zero and 25 decibels, the low level section will exercise complete control to give an attenuation numerically equal, in decibels, to the rise of the input level, thereby maintaining the output level at zero.

When the input signal level, however, reaches some value in excess of 25 decibels, for example, 30 decibels, the low level section becomes unable to produce an attenuation of corresponding magnitude. This is due to the fact that the intensity of the signals reaching amplifier 70 is cut off at a predetermined value by the signal limiter 7, and the intensity of the control direct current supplied from said rectified signals to the bridge 38 is further cut off at a predetermined value by the current limiter 68. The intensity of the control current passing through the bridge 38 can therefore never exceed a predetermined maximum value necessary to give a maximum possible attenuation of 25 decibels, which is in agreement with the physical characteristics and possibilities of the non-linear resistor elements, as explained hereinabove.

When therefore the input signal level reaches in the above-assumed example, a value of 30 decibels, the low section 18 continues to provide a control over the 0-25 decibel range, while the control of the 25-30 decibel range passes to the medium level control section 16. Namely, when the input signal level has a value in excess of 25 decibels, the intensity of said signals is sufficiently high to cause the rectifier 76 to produce a control direct current which is supplied to the bridge 36, and causes said bridge to exercise, within the 25–50 decibel range, a control action similar to that described with regard to the 0–25 decibels' range of the low level bridge 38.

When the input signal level reaches a value in excess of 50 decibels, the high level control section 14 begins to operate in a manner similar to that of the two first sections. Control is then applied by the system in the following manner: section 18 supplies control within the 0–25 decibels' range, section 16 within the 25–50 decibels' range, and section 14 within the 50–75 decibels' range.

Figure 5:
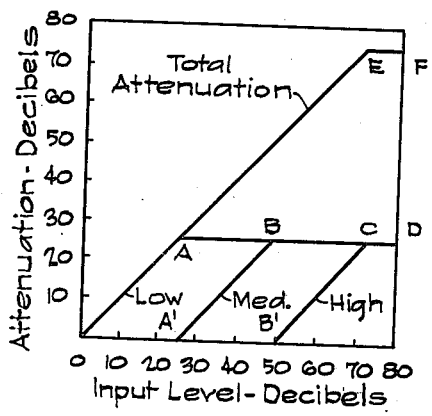
Fig. 5 is an idealized diagram of attenuation effected by a multi-section control system.

The action of the present control system may be further illustrated as follows with regard to the idealized diagram of Fig. 5 showing the relation between the input level and the attenuation (or injected loss) introduced by the present system.

It is seen that as the input level rises from zero to 25 decibels, the low section 18 introduces a corresponding attenuation to maintain the output level at zero. Control is therefore effected along the line OA. Point A, corresponding to an input level of 25 decibels, represents the maximum attenuation which the low level section is capable of providing. The line OA flattens therefore at point A, as shown by line OAD, indicating that at any point between 25 and, for example, 80 decibels' signal input level, the attenuation provided by the low level section is never more than 25 decibels.

At the point $A^1$, however, which, like point A corresponds to a signal input level of 25 decibels, the medium section 16 comes into operation to exercise control along the line $A^1BC$. The same performance is again repeated at 50 decibels signal input level by the high level control section 14 along line $B^1CD$. This will result in a total attenuation effected by the whole system along the line OEF, and will cause the signal output level, as delivered to recorder 12, to remain substantially constant.

The advantages of this mode of operation are considerable. Assume the input level as fluctuating between 50 and 70 decibels. In this case, both the low and the medium level control section are statically active, that is, each provides its unvarying maximum attenuation. The high level section 18 is dynamically active, providing the varying amount, in this case about 20 decibels, of attenuation necessary over the total of the 50 decibels provided by the two lower sections.

In the same manner, if the input level varies between 25 and 50 decibels, only the medium level section will be dynamically active, the low section being statically active, and the high section being altogether inactive.

It will therefore be seen that at any time and for any level of signal input, only one section is dynamically active. This insures that the system will operate with a constant reaction time, said reaction time being simply that of any one of the single sections.

No physical limiters actually exist which can give a sharp bending of a response curve, such as the idealized OAB curve of Fig. 5. However, a good approximation thereto may be obtained by connecting amplitude limiters into the controller channel, for example, connecting two similar non-linear semi-conductor elements, such preferably as selenium or thallium copper elements, as shown at 5 and 7 in Fig. 1. As the voltage across leads 23a and 13a increases, more and more current will flow through the symmetrical structures 5 and 7, the current flowing, for example, downward, the left-hand half of said structure during one half of a cycle, and upwards through the right-hand half of the structure during the other half. As a result, a signal which is received, for example, as a sine wave, is gradually modified into an imperfect square wave. The amplitude of the signals delivered to amplifiers 60 and 70 cannot therefore exceed a predetermined or pre-set value, thereby preventing the medium and the low control sections from operating in a range above that which has been assigned to them.

Since the signal at the limiter 5 (and especially at limiter 7), approximates, particularly at high levels, a square wave, which is rich in harmonics, and since these harmonics may find their way through transformers 84, 86 and 88 to the output, appearing therein as undesirable high frequency distortions of a magnitude increasing with frequency, it may be found desirable to surround the windings of said transformers with floating copper screens (Faraday cage) to effect an electrostatic shielding of one winding from the other.

Amplitude limiters 15 and 17, although similar to the limiters 5 and 7 and used at corresponding points of the main transmission channel, have a purpose somewhat different from that of limiters 5 and 7.

As stated above, no presuppression is used with the present system. Since an initial burst of energy may have some extremely high value, such as 100 decibels or more, and since a definite time delay, such as .15 second is required to bring the amplifiers under control, the grids of the amplifiers 20, 30 and 40 may readily become positive and thus cause overloading with the result of a large low frequency swing at the output. To prevent this, the limiters 15 and 17 act as overload protecting devices during the initial period, and are entirely inactive during the main period of the present control circuit operation.

The rectifiers 74, 76 and 78 may be of any desired type, such as semi-conductors of the same characteristics as in bridges 34, 36 or 38, a full-wave rectification arrangement being preferred. The reactive portions of each section, comprising, for example, condenser 54 and choke 44, determine the reaction time, such as from .2 to .3 second, and also serve as rectification ripple suppressors. Instead of a presuppressor used at the input, a suppressor arrangement may be advantageously used at the output of the main transmission channel to act as an adjustable suppressor or attenuator for the recorder 12.

Such suppressor, as shown in Fig. 1, may be connected to the output of the amplifier 70 and comprises an amplifier 80, thyratron tubes 72 and 82, and a time delay circuit comprising a condenser 75 and variable resistances 73 and 77. As the output voltage of amplifier 70 arises upon the arrival of a strong initial impulse, the first thyratron 72 begins to fire. The second thyratron likewise fires after a time delay predetermined by the constants and the setting of elements 73, 75 and 77. This energizes the relay 92 and opens the initially closed contacts 42, thus connecting the variable resistor 41 across the main transmission channel to introduce additional loss into said channel during the arrival of the first excessively strong impulses. The removal of the shunting resistance 41, which has a value dictated by design considerations, permits the recorder to operate at a proper sensitivity after the passage of the initial strong impulses.

The advantage of the arrangement of resistance 41 in shunt with the bridge 38 may be illustrated by the following example:

Before the arrival of the signals from the detector, the bridge 38 may have a value such as 8000 ohms, and resistor 28 a value such as 40,000 ohms. Therefore, to give an attenuation of 40 decibels, resistance 41 must have a value of 67 ohms. However, after the control current from rectifier 78 has had time to become established, the resistance of the bridge 38 will drop to a value of approximately 430 ohms, so that the parallel combination of resistances 38 and 41 is 58 ohms. Now, when contacts 42 are opened, the resistance is increased to the value of that of bridge 38 only, that is, 430 ohms, which corresponds to an attenuation of 17.5 decibels only. Therefore, the operation is as follows: before the shot, the value of the attenuation introduced is 40 decibels; after the shot it drops to 17.5 decibels, whereby 22.5 decibels are regained. Thus, the contrast in attenuation is automatically reduced as time progresses, and an abrupt change in the appearance of the record at the moment when the contacts 2 open is prevented.

It is understood that since the semi-conductors have a pronounced negative temperature-resistance coefficient of such magnitude as to affect their performance at extreme atmospheric temperature variations encountered in geophysical work, these units should be preferably placed in heat-insulated, thermostat-controlled container unit or units maintained at a constant temperature of about 40° C., which provides the simplest and most reliable solution to this problem.

We claim as our invention:

1. In a seismograph recording system comprising a detector and a recorder, a transmission channel between said detector and said recorder, said transmission channel comprising a plurality of control sections, amplifier means connecting said control sections in cascade with each other for amplifying the signals travelling therethrough, attenuator means in each section for attenuating the intensity of the signals travelling therethrough, said attenuator means in each section being operative between predetermined minimum and maximum levels of the signal input from the detector, said attenuator means comprising a balanced bridge of non-linear resistor elements shunting the transmission channel, and means for supplying to said bridge attenuator means a control current as a function of the level of the signal input, said means comprising a controller channel connected to the detector in parallel with the transmission channel, said controller channel forming a number of controller sections corresponding to the control sections of the transmission channel, means connecting said controller sections in cascade with each other for amplifying the signals applied thereto, and means electromagnetically linking each corresponding pair of control and controller sections to form a control unit, said means comprising a rectifier having its input connected to said controller section and its output connected to said bridge attenuator for supplying thereto a control current, and current limiter means comprising a non-linear resistor element for maintaining said control current below a predetermined maximum value.

2. The system of claim 1, having a plurality of control sections and corresponding controller sections, each corresponding pair of sections operating as a control unit between predetermined minimum and maximum levels of signal input energy, the maximum signal input level of each unit coinciding with the minimum signal input level of the next higher unit, the range between minimum level of the lowest unit and the maximum level of the highest unit being substantially equal to the full range of detector signal variations.

3. In a seismograph recording system comprising a detector and a recorder, automatic volume control means for said system comprising a transmission channel connected between said detector and said recorder, a controller channel connected in parallel with said transmission channel, means coupling said transmission and controller channels to form a high, medium and low level control unit, each of said control units comprising a rectifier having its input connected to the controller channel, attenuator means comprising a balanced bridge formed of non-linear resistor elements connected across the transmission channel, a filter circuit connecting the output of said rectifier to said bridge to pass therethrough a control current proportional to the intensity of the signals supplied to said rectifier, whereby the intensity of the signals passing through the transmission channel is attenuated as a function of said control current by the variable shunting action of said bridge, and amplifier and current limiter means connected in said transmission and said controller channels between said high and medium level control units and said medium and low level control units, whereby the attenuation provided by each of said control units is maintained between predetermined minimum and maximum levels.

ALFRED J. HERMONT.
JEROME C. TOUPS.

REFERENCES CITED

The following references are of record in the file of this patent:

UNITED STATES PATENTS

| Number | Name | Date |
|---|---|---|
| 2,295,410 | Kreuzer | Sept. 8, 1942 |
| 2,378,925 | Hoskins et al. | June 26, 1945 |
| 2,390,856 | Thompson | Dec. 11, 1945 |